(12) United States Patent
Pratt

(10) Patent No.: US 7,857,563 B2
(45) Date of Patent: Dec. 28, 2010

(54) MECHANICALLY LOCKED BLIND BOLT FASTENER

(75) Inventor: John D. Pratt, Laguna Nigel, CA (US)

(73) Assignee: Monogram Aerospace Fasteners, Inc., Los Angeles, CA (US)

( * ) Notice: Subject to any disclaimer, the term of this patent is extended or adjusted under 35 U.S.C. 154(b) by 381 days.

(21) Appl. No.: 11/712,350

(22) Filed: Feb. 28, 2007

(65) Prior Publication Data

US 2007/0243035 A1    Oct. 18, 2007

Related U.S. Application Data

(60) Provisional application No. 60/777,379, filed on Feb. 28, 2006.

(51) Int. Cl.
*F16B 13/04* (2006.01)
(52) U.S. Cl. .......................... 411/34; 411/43
(58) Field of Classification Search .......... 411/34, 411/55, 40, 45–48, 38, 43, 49, 999, 113
See application file for complete search history.

(56) References Cited

U.S. PATENT DOCUMENTS

| | | | |
|---|---|---|---|
| 2,282,711 A | 5/1942 | Eklund | |
| 2,763,314 A | 9/1956 | Gill | |
| 2,863,351 A | 12/1958 | Vaughn | |
| 2,971,425 A | 2/1961 | Blakeley | |
| 3,085,463 A * | 4/1963 | Lay | 411/34 |
| 3,236,143 A | 2/1966 | Wing | |
| 3,345,900 A | 10/1967 | Villo | |
| 3,461,771 A | 8/1969 | Briles | |
| 3,505,921 A * | 4/1970 | Wigam | 411/34 |
| 4,015,505 A | 4/1977 | Murray | |
| 4,237,768 A | 12/1980 | Volkmann | |
| 4,602,902 A * | 7/1986 | Herb | 411/45 |
| 4,772,167 A | 9/1988 | Beals | |
| 4,929,134 A * | 5/1990 | Bergner | 411/30 |
| 4,950,115 A | 8/1990 | Sadri | |
| 4,984,945 A * | 1/1991 | Bergner | 411/30 |
| 4,988,247 A | 1/1991 | Summerlin | |
| 5,498,110 A | 3/1996 | Stencel et al. | |
| 5,569,005 A | 10/1996 | Millington | |
| 5,620,287 A * | 4/1997 | Pratt | 411/43 |
| 5,634,751 A | 6/1997 | Stencel et al. | |
| 5,759,001 A | 6/1998 | Smith | |
| 5,779,410 A * | 7/1998 | Lautenschlager et al. | 411/33 |
| 5,816,761 A | 10/1998 | Cassatt et al. | |

(Continued)

OTHER PUBLICATIONS

International Search Reported from PCT/US07/05382, dated Sep. 18, 2008, 6 pgs.

*Primary Examiner*—Gary Estremsky
(74) *Attorney, Agent, or Firm*—Woodard, Emhardt, Moriarty, McNett & Henry LLP

(57) ABSTRACT

The present invention provides a blind bolt fastener having a core bolt. The core bolt has a threaded portion and a non-threaded portion engaging a deformable sleeve and a body. A protrusion extends from the sleeve or the body to engage a groove in the core bolt to prevent axial movement of the core bolt with respect to the body and the sleeve. An optional drive nut is positioned between a head of the body and wrenching flats of the core bolt. The drive nut has protrusions engaging mating members in the head of the body.

31 Claims, 9 Drawing Sheets

U.S. PATENT DOCUMENTS

| | | |
|---|---|---|
| 5,947,667 A | 9/1999 | Cassatt et al. |
| 6,007,009 A * | 12/1999 | Sheridan et al. ............. 241/207 |
| 6,062,783 A | 5/2000 | Austin |
| 6,224,309 B1 | 5/2001 | Yamamoto |
| 6,746,191 B2 * | 6/2004 | Edland ........................ 411/34 |
| 6,868,757 B2 | 3/2005 | Hufnagl et al. |
| 6,893,196 B2 * | 5/2005 | Wille ........................... 411/34 |
| 6,896,460 B2 * | 5/2005 | Enomoto et al. .............. 411/41 |
| 6,935,821 B2 * | 8/2005 | Bodin et al. ................... 411/29 |
| 2002/0146298 A1 * | 10/2002 | Cosenza et al. ............... 411/34 |
| 2004/0022596 A1 | 2/2004 | Belanger |
| 2005/0123372 A1 | 6/2005 | Sato |
| 2005/0201845 A1 * | 9/2005 | Keener ........................ 411/44 |

* cited by examiner

MECHANICALLY LOCKED BLIND BOLT FASTENER

CROSS-REFERENCE TO RELATED APPLICATIONS

This application claims priority from U.S. Provisional Patent Application No. 60/777,379, entitled "Mechanically Locked Blind Bolt Fastener" filed on Feb. 28, 2006, which is hereby incorporated by reference.

FIELD OF THE INVENTION

The present invention is generally related to blind fasteners, and more particularly to mechanically locked blind bolt fasteners.

BACKGROUND OF THE INVENTION

Blind fasteners are used in a variety of applications to connect two or more workpieces together. In the construction of aerodynamic designs, such as control surfaces on aircraft and the like, a substantially flush surface usually is desired on the accessible side of the panels. Often, however, access to the blind side is not possible, which can complicate fastener installation. In these cases, the use of a blind fastener is appropriate, since access to only one side of the panel is available to install the fastener.

Typical blind fasteners comprise an internally threaded nut body and an externally threaded cylindrical core bolt or stem passing in threaded engagement through the nut body. The inserted end of the core bolt has an enlarged core bolt head while the other end of the core bolt has a wrench-engaging portion. Thus, upon insertion of the fastener into the aligned apertures of a pair of workpieces and upon turning motion of the core bolt relative to the nut body, the core bolt is moved in an axially outward direction through the nut body. This axially outward movement typically causes a deformable sleeve around the core bolt and intermediate the nut body to deform around the tapered nose of the nut body. The deformable sleeve forms a bulb-like shape to provide a blind side head against the inner surface of the inner work piece. The core bolt further is provided with a localized weakened region or break groove adapted to sever the core bolt at a predetermined torque and location.

It is advantageous that the break groove shears the core bolt in a substantially flush relation to the fastener body head after the fastener is fully set. Particularly, accurate core bolt break is sought for fasteners having countersunk body heads to provide a flush relationship between the set fastener and the outer panel, thus providing a smooth aerodynamic surface after the fastener is set.

However, due to numerous factors including variations in combined panel thickness, sometimes the break groove on the core bolt extends beyond a flush position with the fastener body head. Therefore, when shear or breakage occurs at the break groove, a portion of the remaining core bolt protrudes beyond the fastener body head. As a result, it is often necessary to grind the protruding core bolt so that the core bolt is flush with the fastener body head. Prevention of such protrusion will provide a cost savings through the elimination of additional operations and manpower required in shaving, smoothing, and trimming the protruding core bolt stem to provide a flush finish.

Conversely, positioning the break groove to break flush to below the head surface can result in cavities that must be filled. Again, eliminating the need to fill such cavities will provide a cost savings through the elimination of additional operations and manpower required to provide a flush finish. In addition, low breaks (below flush) may result in some loss of strength in the fastener head.

Additional requirements for fasteners are required when used on aircraft. For example, components of multi-piece mechanical fasteners used on aircraft forward of the engine air inlets must be mechanically locked to prevent unthreading. As a result of mechanically locking the fasteners, the likelihood of such fasteners becoming loose and being subsequently ingested by the engine is reduced. Conventional non-blind threaded fasteners are typically lock-wired to achieve this goal. Lower-strength blind fasteners, on the other hand, often incorporate a locking ring to achieve this goal. Both of these approaches, however, require additional steps in the process of installing the fasteners into the aircraft and/or require additional components to be included with the fasteners. Further, it is not economically feasible to incorporate a locking ring into a high strength blind fastener; particularly the threaded type described herein.

Generally, structural joints should have strength at least equivalent to the panels in which they are installed. Otherwise, the fasteners will fail before the panels fail. As airframe joints are designed to carry shear loads, the joint shear strengths should correspond with the structure material bearing load strength. The shear load capability of a structural joint is usually measured using Metallic Materials Property Development and Standardization (FAA/DOD MMPDS) guidelines and testing in accordance with MIL-STD-1312 Test Method #4. A load versus elongation plot of a single fastener joint is shown in FIG. 5. Generally, the higher the yield strength and ultimate strength (i.e., higher curve), the more suitable the fastener is for structural applications.

Having a relatively large residual clamp load in the joint enhances structural strength. In addition, the large residual clamp load allows fasteners to close gaps between panels and keep the panels tightly clamped together as desired. High residual clamp loads also reduce microscopic movement between metal panels during flight operations, thereby minimizing the likelihood that fretting and fatigue cracks will develop.

Laminated carbon fiber composites are becoming increasingly prevalent in airframe structure. Primarily, laminated carbon fiber composites provide lighter weight and accompanying fuel savings. Composites, however, cannot endure the high compressive stresses induced by the installation of conventional fasteners designed for metallic structure. It is, therefore, desired to spread the fastener clamp loads over a large region on the panels to minimize contact stresses while maintaining high clamp loads.

Existing blind fasteners incorporating a locking ring fail to provide one or more of the above-mentioned features. Pull-type blind bolts, for example, incorporate band-annealed sleeve components for a controlled upset against the panel surface. This softening of the sleeve necessarily extends into the shear plane, reducing joint strength and/or stiffness. In addition, the pull-type nature of these fasteners causes a majority of the installation clamp load to relax upon the fracture of the pintail during installation. Specifically, the pintail of the pull-type fasteners tends to recoil upon fracture of the pintail.

Existing blind rivets induce minute clamp load or sheet gathering capability and have an extremely small blind side upset compared to blind bolts. These are generally suitable for low-strength applications in secondary metal structure (e.g., control surfaces), but are not strong enough for highly loaded primary structure (e.g., fuselage and wing joints).

Additional information will be set forth in the description which follows, and in part will be obvious from the description, or may be learned by practice of the invention. The present invention overcomes these deficiencies of known fasteners. One of ordinary skill in the art will also appreciate additional advantages of the present invention.

SUMMARY OF INVENTION

The present invention advantageously provides a blind bolt fastener having a core bolt to body mechanical lock and a sleeve to body mechanical lock. The core bolt is threadingly engaged with the sleeve. The body is positioned between a wrenching region of the core bolt and the sleeve. The core bolt has a groove for receiving a nose portion of the body to mechanically lock the core bolt to the body. The sleeve has a protrusion (or nose region) for engaging a groove in the body to mechanically lock the sleeve to the body. In a preferred embodiment, the core bolt mechanically locks to an integrally formed body and sleeve to prevent the core bolt from unthreading from the sleeve and/or the body.

DESCRIPTION OF THE DRAWINGS

Operation of the invention may be better understood by reference to the following detailed description taken in connection with the following illustrations, wherein.

DETAILED DESCRIPTION

Figure 1:
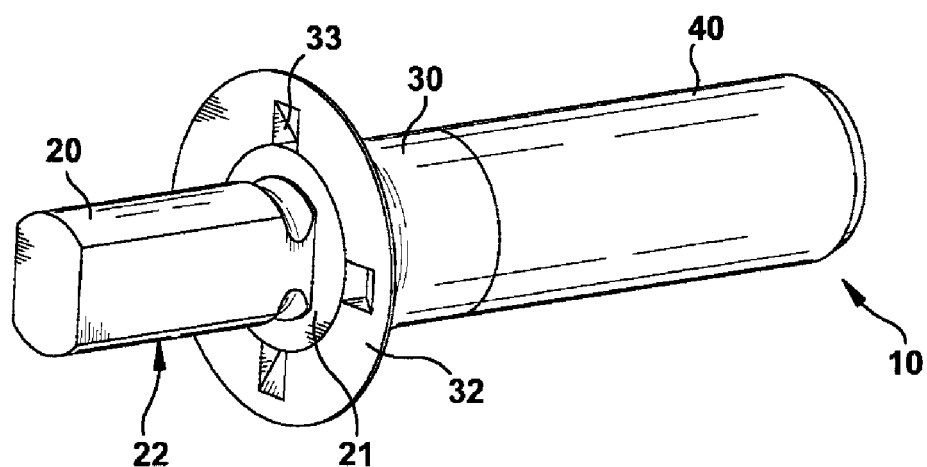
FIG. 1 is a perspective view of a blind bolt fastener in an embodiment of the present invention.

While the present invention is described with reference to the embodiments described herein, it should be clear that the present invention should not be limited to such embodiments. Therefore, the description of the embodiments herein is illustrative of the present invention and should not limit the scope of the invention as claimed.

Reference will now be made in detail to the embodiments of the invention as illustrated in the accompanying figures. FIGS. 1-4 illustrate an embodiment of the present invention having a mechanically locked blind bolt fastener 10. The mechanically locked blind bolt fastener 10 comprises a core bolt 20, a body 30, a deformable sleeve 40, and at least one mechanical lock 50. The core bolt 20 is threadingly engaged with the deformable sleeve 40 and rotatively engaged with the body 30. The body 30 may be integrally formed with the deformable sleeve 40 into a single deformable body, or alternatively, the body 30 may be separate from the deformable sleeve 40.

The core bolt 20 comprises core bolt wrenching flats 22 and a core bolt head 21. The core bolt wrenching flats 22 may be sized and shaped for engagement with a wrenching tool (not shown). The core bolt head 21 is an enlarged head that may be positioned adjacent to the wrenching flats 22. The core bolt 20 may have a non-threaded portion 23 proximate and adjacent to the core bolt head 21. The core bolt 20 has a threaded portion 24 adjacent the non-threaded portion 23 and distal to the core bolt head 21. In an embodiment, the non-threaded portion 23 terminates at the threaded portion 24. The threaded portion 24 of the core bolt 21 may have threads 25 for threadingly engaging the deformable sleeve 40. In a preferred embodiment, the threads 25 are buttress threads that are described in further detail below.

FIGS. 1-4 further illustrate the core bolt 20 having a core bolt break groove 26. The core bolt break groove 26 is a weakened region or portion of the core bolt 20. To this end, the core bolt break groove 26 is weakened such that the core bolt 20 will fracture when a preselected amount of stress is applied to the core bolt 20 during installation of the blind bolt fastener 10. In an exemplary embodiment, the fracture of the core bolt 20 is designed to occur upon completion of the installation of the blind bolt fastener 10. For example, the core bolt 20 fractures at the core bolt break groove 26 when the torque required to deform the sleeve 40 exceeds the torsional strength of the core bolt break groove 26.

The body 30 has a head 32, such as an enlarged head, as illustrated in FIGS. 1-4. The head 32 includes a contact surface 34 that is adapted to sit at or near a top of a cavity in the access side of, for example, a pair of structural panels being fastened together with contact surface 34 clamping a panel on one side of the fastener. The head 32 may be of a protruding type, setting on the surface of the access side panel. The head 32 may have body-wrenching members 33. Preferably, the body-wrenching members 33 are crevices or grooves sized to engage a wrenching tool (not shown). The wrenching members 33 engage an end of the wrenching tool that may be used to drive the core bolt 20. The wrenching members 33 may be used to prevent rotation of the body 30 with respect to the core bolt 20.

The sleeve 40 may be a deformable sleeve that is capable of bulbing to provide force on the blind side of, for example, a work piece or panel. The sleeve 40 can be made of a malleable material that has the ability to expand without fracturing. For example, annealed AISI 304 stainless steel is able to undergo a strain of approximately 100% without fracturing. Alternatively, Commercially-Pure Titanium, 300-Series Stainless steel, and A-286 Corrosion and Heat Resisting Steel can be used. Of course, combinations of these and other materials as known to those of ordinary skilled in the art can be used.

The sleeve 40 has a tapered or stepped bore 42. Preferably, the bore 42 has threads 43, for example, female threads for threadingly engaging the threads 25 of the core bolt 21. In an embodiment, the female threads 43 of the bore 42 are buttress threads that may matingly engage the threaded portion 24 of the core bolt 20. Buttress threads incorporate a steep pressure flank and a shallow non-pressure flank. For example, the buttress threads have a pressure flank of approximately between 75 and 90 degrees off the axis of the core bolt 20 is incorporated into the threads 43. In such an embodiment, the non-pressure flank may be approximately 45 degrees. Further, the pitch of the thread or threads per inch of each flank may be similar to that used for a 60 degree thread used on existing threaded blind bolts, such as, MIL-S-8879 and MIL-S-7742. The buttress profile results in a lower radial component of force so that the female threads 43 of the sleeve 40 are prevented from expanding radially to the same extent as conventional threads expand. A large radial component of force can cause the threads 43 of the sleeve 40 to become disengaged with the male threads 24 of the core bolt 21 and may result in a weaker structural connection. With conventional threads the typical solution is to increase the number of threads; however, additional threads increases the length and installation weight of the fastener. Advantageously, the buttress threads avoid undesired radial expansion of the sleeve-threaded portion 43 with a minimal amount of thread engagement. The length of engagement is driven by the shear strength of the threads, rather than being limited by radial expansion.

Figure 2:
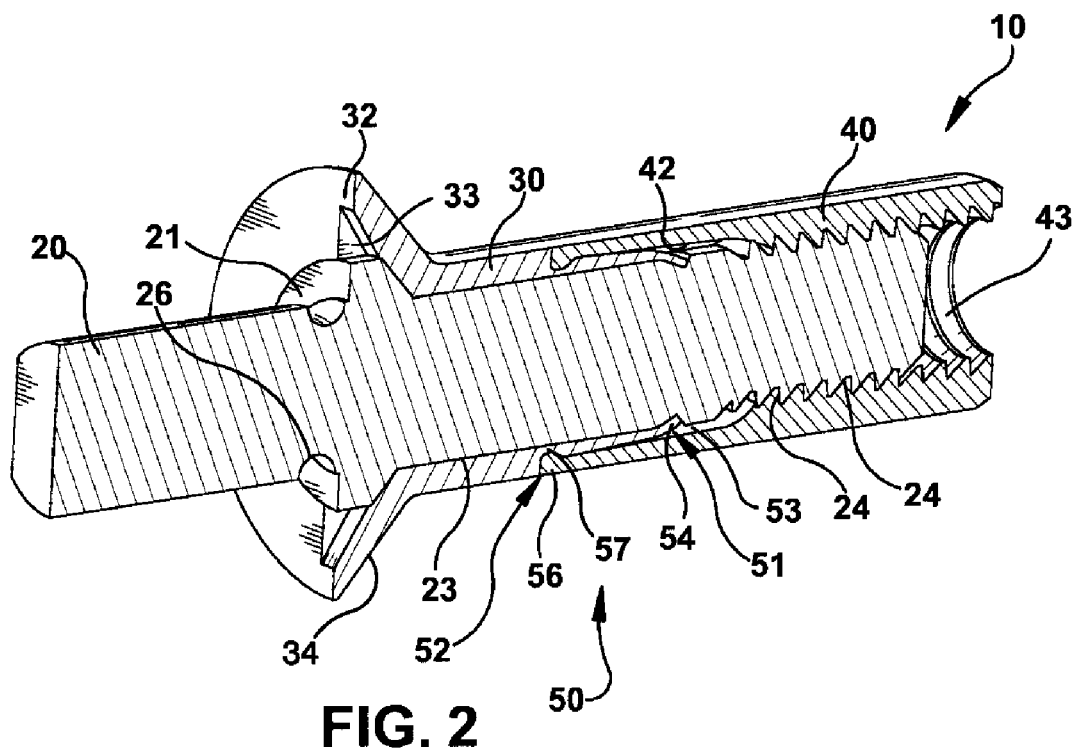
FIG. 2 is a cross-sectional view of the blind bolt fastener of FIG. 1.
Figure 3:
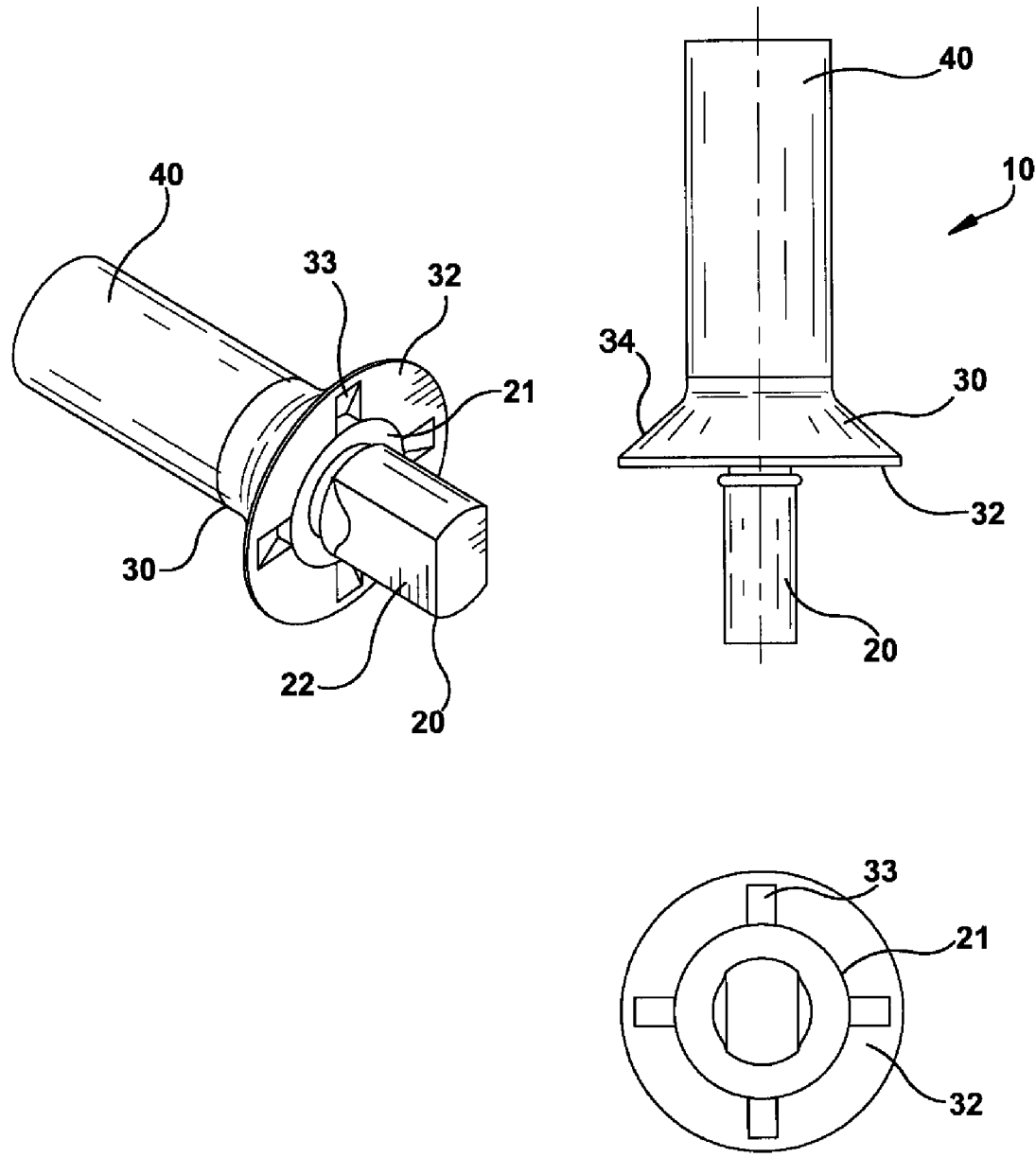
FIG. 3 illustrates side, perspective and top views of a blind bolt fastener in an embodiment of the present invention.
Figure 4:
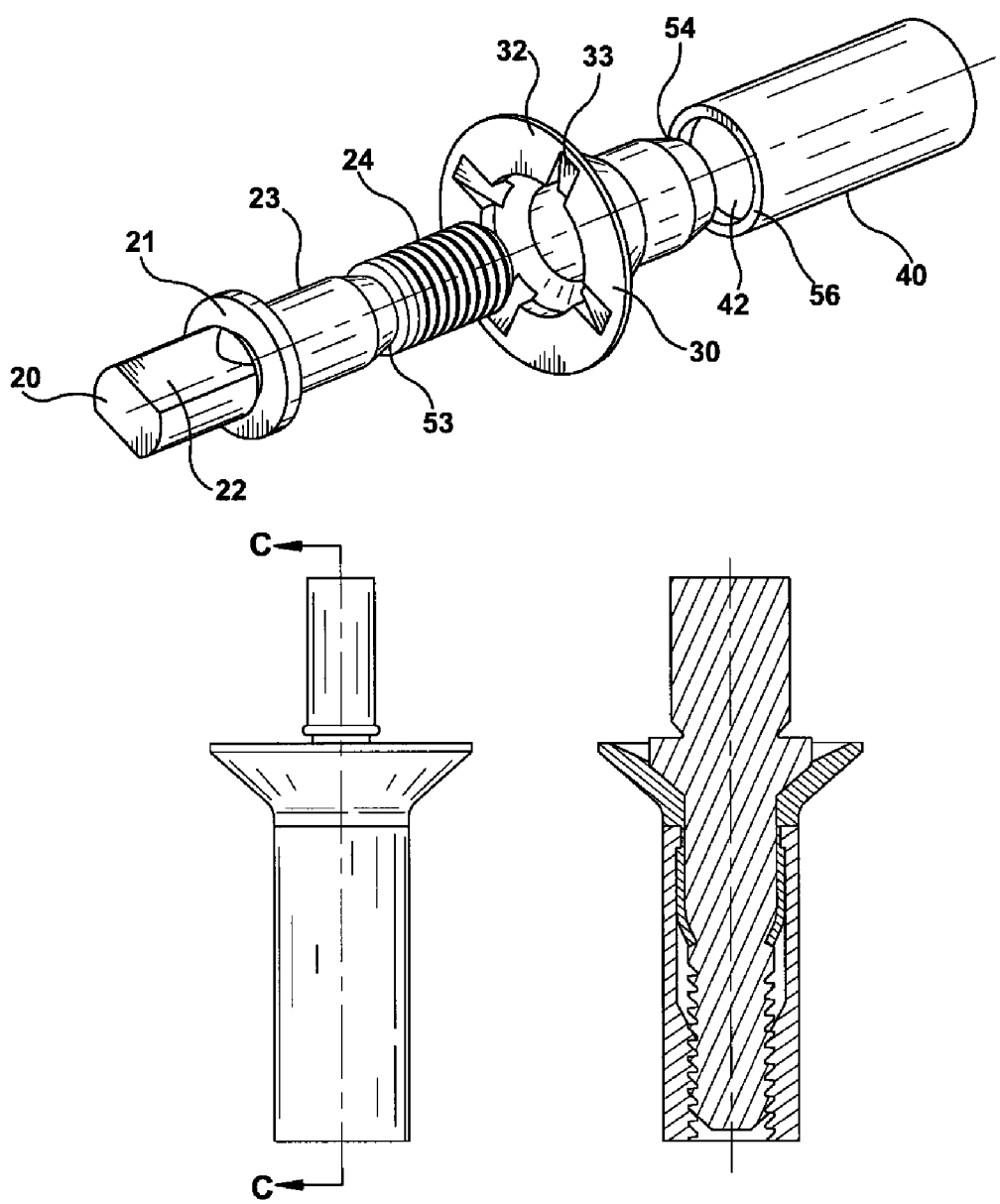
FIG. 4 illustrates an exploded view, a side view and a cross-sectional view taken generally along line C-C of a blind bolt fastener in an embodiment of the present invention.
Figure 5:
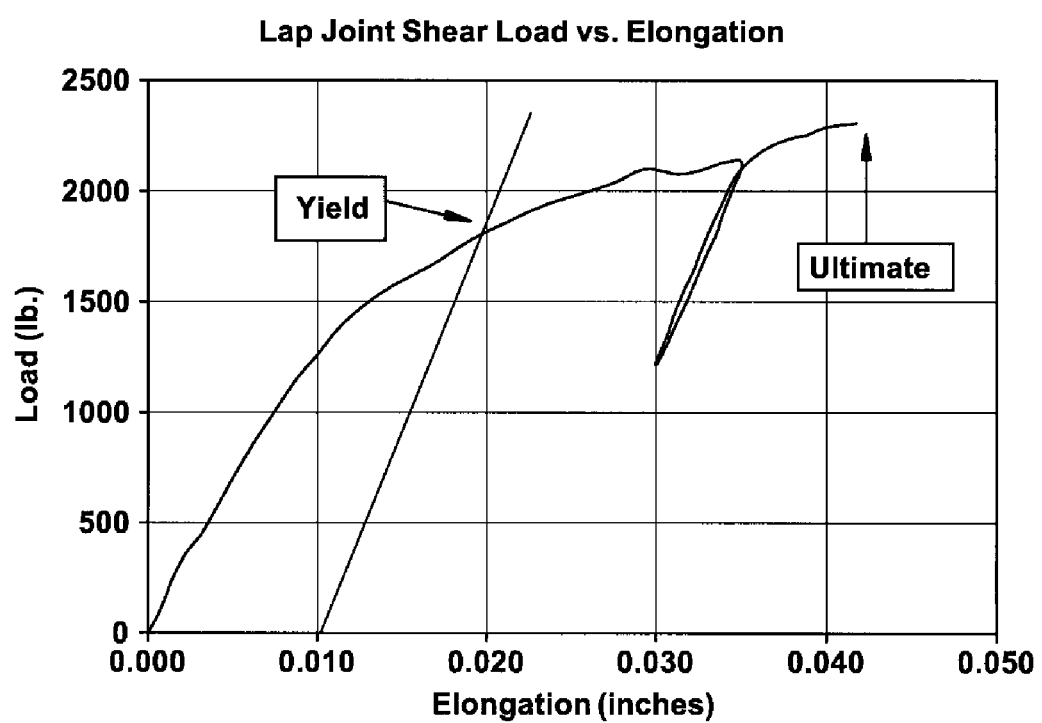
FIG. 5 is a lap joint shear load versus elongation plot of a single fastener joint having a blind bolt fastener in an embodiment of the present invention.

With continued reference to FIGS. 1-4, and particularly with reference to FIG. 2, the mechanical lock 50 shown in the first embodiment comprises a body-to-core bolt lock 51 and a sleeve-to-body lock 52. The body-to-core bolt lock 51 comprises an external groove 53 in the core bolt 20 engagable with a protuberance 54 of the body 30. The external groove 53 of the core bolt 20 is sized and shaped to correspond to the protuberance 54 of the body 30. A swaged nose region or a crimped body provides the protuberance 54 on the body 30 to mechanically lock the core bolt 20 to the body 30. Mechanically locking the core bolt 20 to the body 30 may prevent the core bolt 20 from unthreading and/or otherwise disengaging from the sleeve 40.

The sleeve-to-body lock 52 comprises an edge 56 of the sleeve 40 that engages at least one groove 57 in the body 30. As best shown in FIG. 2, the edge 56 of the sleeve 40 extends between the ends of the body 30. For example, the edge 56 extends along the exterior edge between the ends of the body 30 to engage the groove 57 of the body 30. The edge 56 of the sleeve 40 engages the groove 57 to mechanically lock the sleeve 40 with the body 30. As should be clear, no such sleeve-to-body lock 52 is required when the body 30 and sleeve 40 are formed as an integral component as described in greater detail below.

Figure 9:
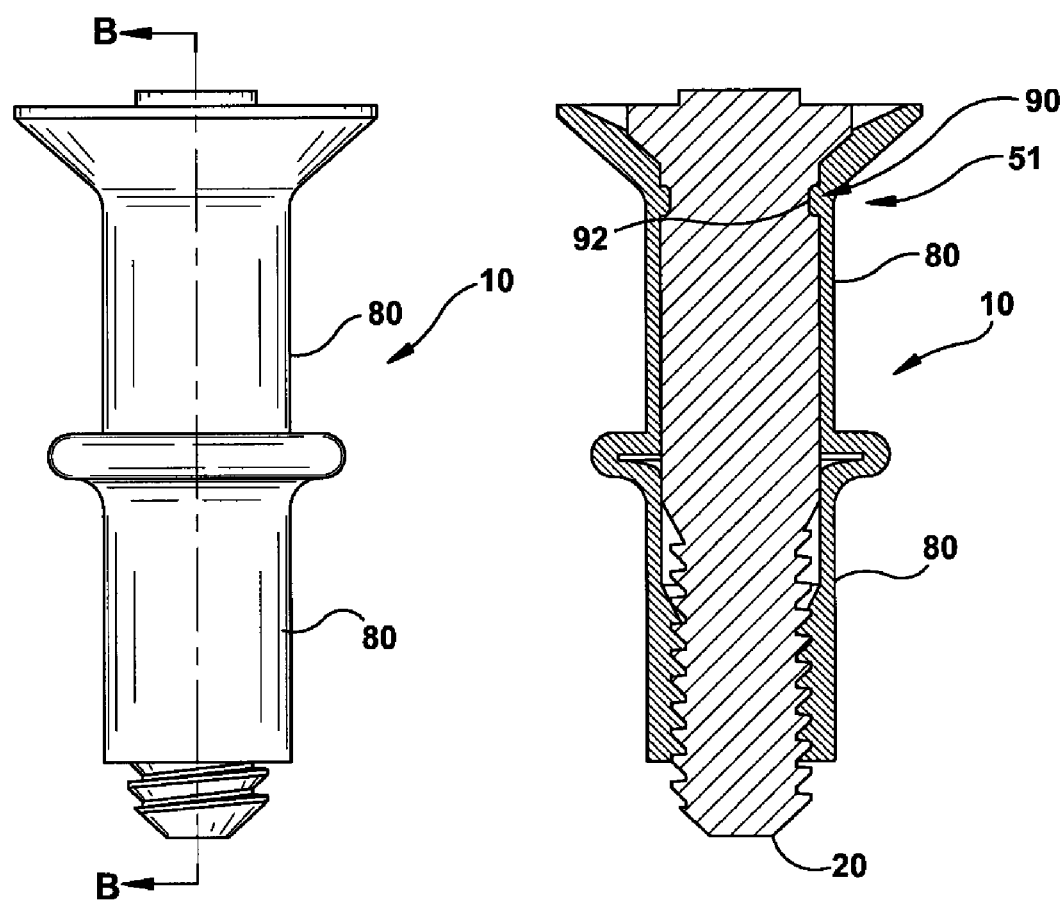
FIG. 9 is a side view and a cross-sectional view taken generally along line B-B of a blind bolt fastener having a bulbing portion in an embodiment of the present invention wherein the body and sleeve are integrally formed.
Figure 10:
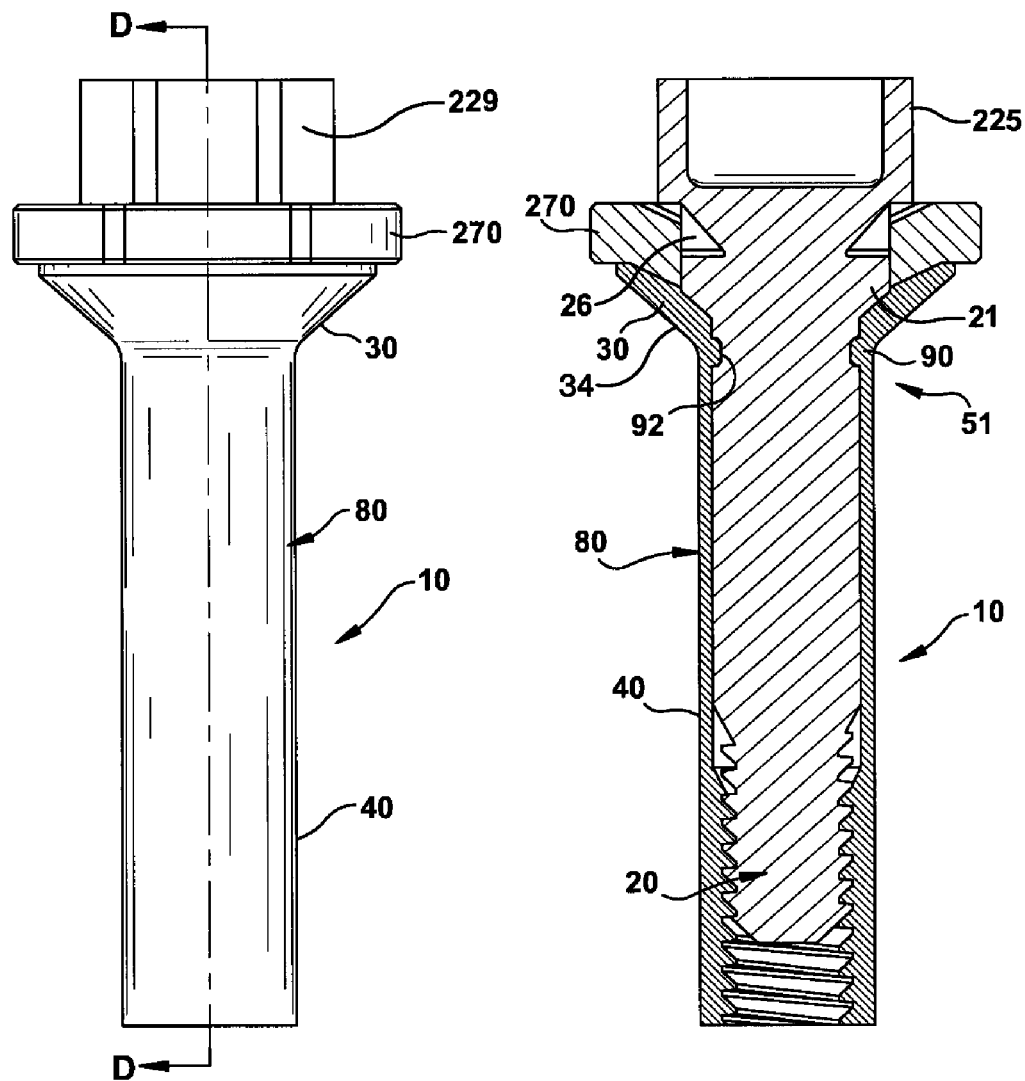
FIG. 10 is a schematic of a side view and a cross-sectional view taken generally along line D-D of the blind bolt fastener of FIG. 9 prior to installation.

With reference to FIGS. 9 and 10, the mechanical lock 50 shown in another embodiment incorporates only a body-to-core bolt lock 51 wherein the sleeve and body are integrally formed into a single deformable body 80. A protuberance 90 in the deformable body 80 engages a groove 92 in the core bolt 20. The core bolt 20 rotates with respect to the deformable body 80. The protuberance 90 and the groove 92 engage to prevent the core bolt 20 from unthreading or otherwise moving axially out of the integral sleeve 40 and the body 30. Accordingly, the grooves 92 and the protuberance 90 prevent axial movement of the core bolt 20 with respect to the deformable body 80 and the sleeve 40.

Therefore, the mechanical lock 50 includes a protuberance 54,90 on the body that engages an external groove 53,92 in the core bolt 20 so as to mechanically prevent axial movement of the core bolt 20 relative to the body (whether an integral body 80 or a two piece body 30,40 is provided). With the two-piece body, the sleeve 40 is threaded onto the core bolt 20 until the leading edge 56 abuts the end of the body groove 57 adjacent to the head 32 of the body 30. The sleeve 40 is crimped or swaged into the groove 57 such that an outer diameter, D, of the blind bolt fastener 10 is substantially uniform in size from the head 32 of the body 30 and the end of the sleeve 40 distant to the head 32 with contact surface 34 having a larger outer diameter than outer diameter D so that contact surface 34 bears against the access side surface and does not pass through the cavity on the access side.

Figure 6:
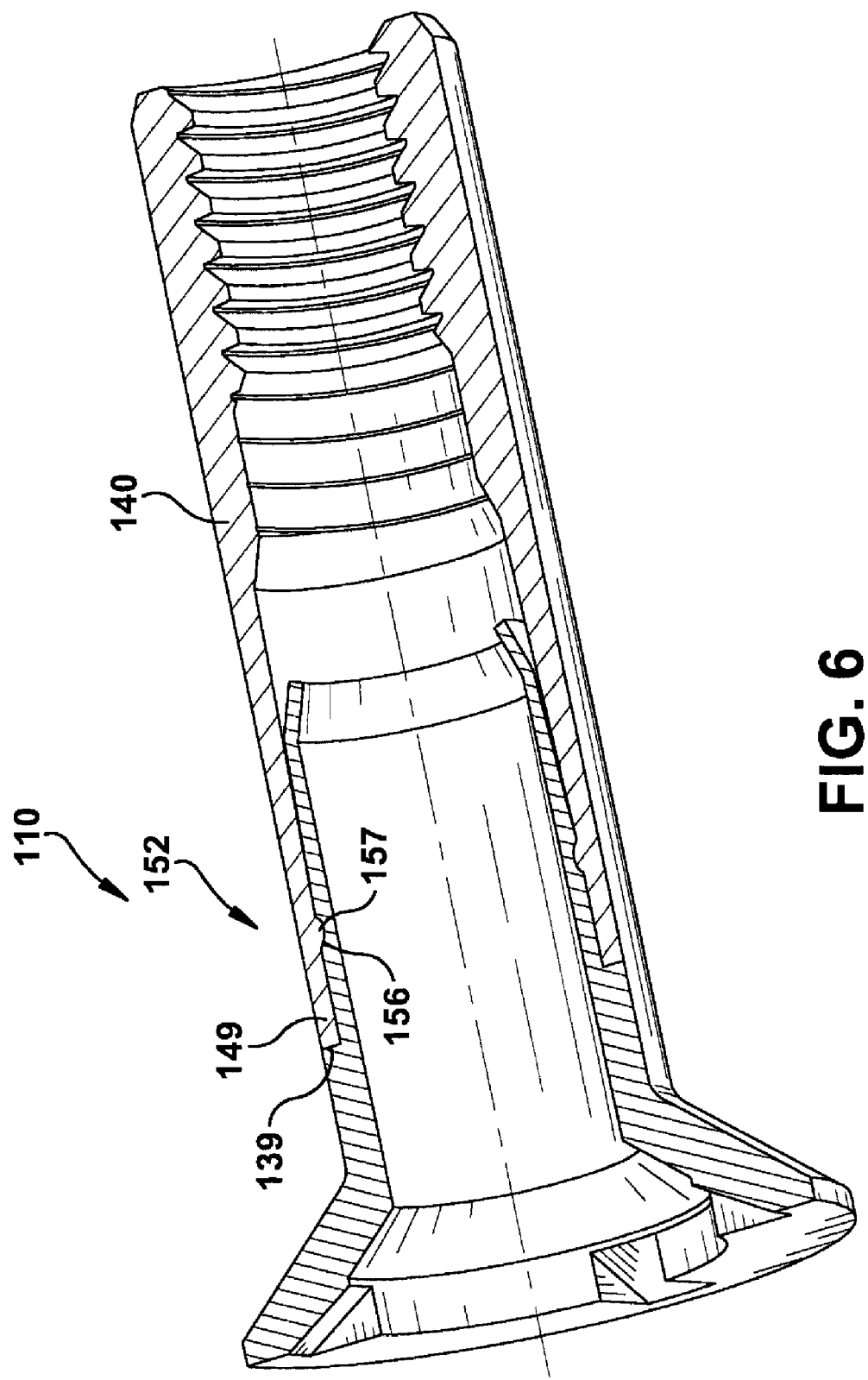
FIG. 6 is a cross-sectional view of a blind bolt fastener having an elongated sleeve in an embodiment of the present invention.

FIG. 6 illustrates another embodiment of the blind bolt fastener 110. In such an embodiment, the sleeve 140 extends beyond the locking groove 157 in the body 130 to form an extension portion 149 in the sleeve 140. The body 130 has a second groove 139 adjacent the groove 157 to accommodate the extension portion 149 of the sleeve 140. Preferably, the second groove 139 has a cross-section that is rectangular in shape. The second groove 139 of the body 130 can be any shape for engaging the body 130.

A protrusion 156 of the sleeve 140 engages the groove 157 in the body 130 to mechanically lock the sleeve 140 with the body 130. The extension portion 149 of the sleeve 140 results in higher lap joint shear strength by maintaining the sleeve-to-body lock 152 during installation of the fastener 10, 110. Specifically, when applying torque to the core bolt 20, the extension portion 149 maintains engagement between the sleeve 140 and the body 130 longer than conventional fasteners.

In a lap joint, the separating panels cause the blind bolt fastener 110 to rotate. Such rotation results in higher loads against one half of the blind head by the tail side panel. These loads act to pull the sleeve 140 out of the groove 157 thereby breaking or dislodging the sleeve-to-body lock 152. The second groove 139 is positioned snugly and abuts the body 130 to delay or otherwise prevent premature disengagement of the sleeve-to-body lock 152. In an embodiment, the second groove 139 is positioned so that the sleeve-to-body lock 152 disengages at a predetermined time or amount of torque applied during installation.

The blind side sleeve formation is controlled by the tapered or stepped bore 42, which causes the sleeve 40 to buckle outwardly near the outer surface of the inner panel or blind side surface. The buckling or bulbing of the sleeve 40 ensures that the sleeve 40, 140 lies tightly against the panel. Band annealing may be avoided so that the shear strength is not compromised. Advantageously, the residual clamp load is near maximum during formation of the blind side upset of the sleeve 40, 140 due to a minimum or absence of axial recoil upon torsional fracture at the break groove.

Figure 7:
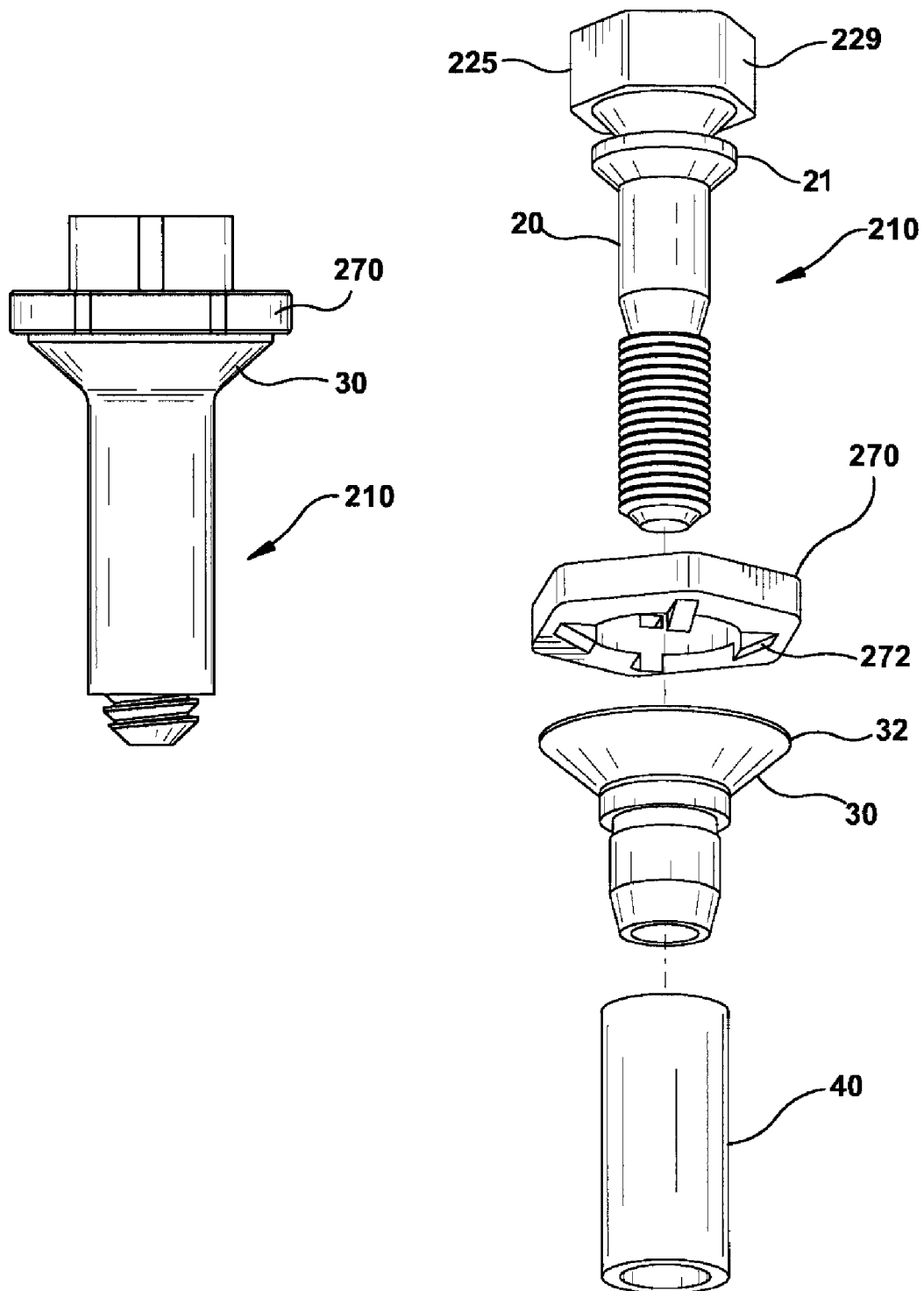
FIG. 7 is an exploded view and a side assembled view of a blind bolt fastener of in an embodiment of the present invention.
Figure 8:
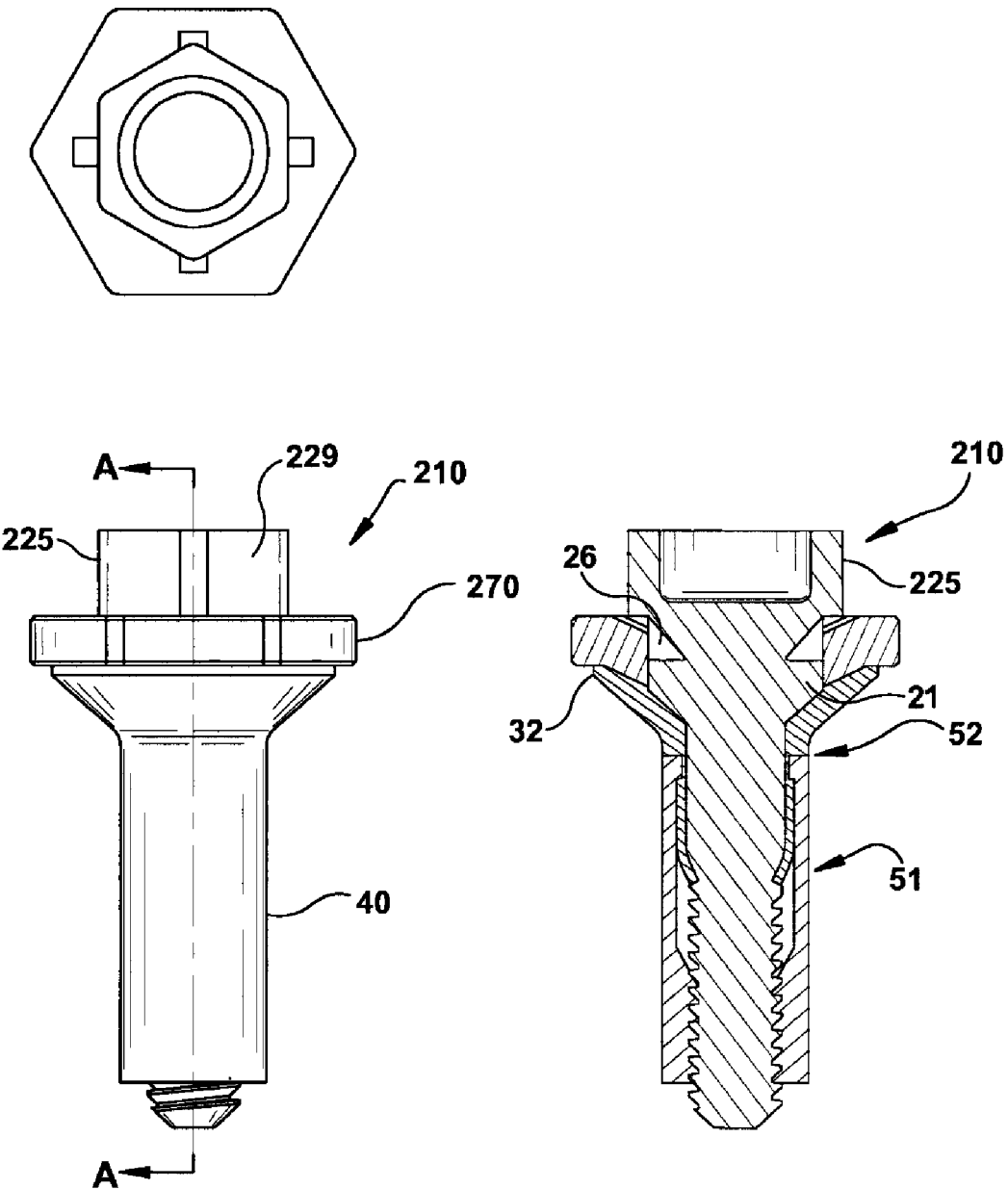
FIG. 8 is a top view, a side view and a cross-sectional view taken generally along line A-A of a blind bolt fastener in an embodiment of the present invention.

In yet another embodiment shown in FIGS. 7 and 8, the blind bolt fastener 210 incorporates a drive nut 270. The drive nut 270 may be provided to any of the embodiments of the present invention to prevent rotation of the body during installation of the fastener 10, 110, 210. The drive nut 270 may be positioned between the head 32 of the body 30 and a wrenching portion 229 of the core bolt 20. In an embodiment, the drive nut 270 is positioned to snugly fit between the head 32 and the wrenching portion 229 to axially entrap drive nut 270 therebetween. In a preferred embodiment, the drive nut 270 has no internal threads so that drive nut 270 is not threadingly engaged with the core bolt.

The drive nut 270 has protrusions 272 for engaging mating members 36 of the head 32 of the body 30. In a preferred embodiment, the protrusions 272 are pre-formed to wrenchingly engaging the mating members 36, which may be, for example, crevices or recesses corresponding in size and shape to the protrusions 272 of the drive nut 270. The drive nut 270 is positioned such that the protrusions 272 engage the head 32 of the body 30 upon assembly so that drive nut 270 and body 30 are rotationally constrained together. Failure to preposition the protrusions 272 into the mating members 36 may prevent the head 21 of the core bolt 20 from properly seating in the head 32 of the body 30 if the drive nut 270 remains unseated throughout the installation process.

In yet another alternative embodiment, the drive nut 270 could incorporate a raised deformable portion adjacent the body head 32. This deformable portion would deform into the head 32 of the body 30 during assembly of the fastener components or alternatively during the installation.

In either case, the drive nut 270 is engaged by, and prevented from rotating by, the fixed tool housing. The drive nut 270 has protrusions 272 or an extending deformable portion capable of engaging the mating members 36 or recesses in the head 32 of the body 30 to prevent rotation of the body 30. The drive nut 270 is trapped, for example, axially between the head 32 of the body 30 and enlarged bolt head 225 with the wrenching portion 229 of the core bolt 20. To this end, the drive nut 270 remains engaged with the head 32 of the body 30 during installation. The frangible portion of the core bolt 20 and the drive nut 270 are discardable upon completion of the installation.

The invention has been described above and, obviously, modifications and alternations will occur to others upon a reading and understanding of this specification. The claims as follows are intended to include all modifications and alterations insofar as they come within the scope of the claims or the equivalent thereof.

Having thus described the invention, I claim:

1. A blind bolt fastener for clamping multiple work pieces to one another through aligned apertures, the blind bolt fastener comprising:
   a core bolt having a wrench engaging portion at one end and a threaded portion at the opposite end;
   a radial locking groove located between the wrench engaging portion and the threaded portion;
   a body comprising a metallic material, said body having a bore for receiving the core bolt, the body having an enlarged head at one end, the enlarged head having a contact surface adapted to not be able to pass through the apertures; and
   a protuberance extending inwardly within the bore to engage the radial locking groove to restrict axial movement of the core bolt relative to the body during and after installation.

2. The blind bolt fastener of claim 1 further comprising:
   a break groove in the core bolt, the break groove fracturing when a predetermined amount of torque is applied to the core bolt.

3. The blind bolt fastener of claim 1 further comprising:
   a deformable sleeve mechanically locked to the body.

4. The blind bolt fastener of claim 3 wherein the deformable sleeve and the body are integrally formed into a deformable body.

5. The blind bolt fastener of claim 4 wherein a portion of the core bolt is threadingly engaged within the bore of the deformable body.

6. The blind bolt fastener of claim 5 wherein the bore of the deformable body is tapered.

7. The blind bolt fastener of claim 3, wherein the deformable sleeve has a tapered bore.

8. The blind bolt fastener of claim 1 further comprising:
   a drive nut substantially rotationally constrained with the body, wherein the drive nut is positioned axially between the enlarged head of the body and the wrench engaging portion of the core bolt.

9. The blind bolt fastener of claim 8 wherein the drive nut is substantially axially entrapped between the wrench engaging portion and the enlarged head of the body.

10. The blind bolt fastener of claim 9 wherein the drive nut is not in threaded engagement with the core bolt.

11. The blind bolt fastener of claim 1, wherein the protuberance is integrally formed with the body after assembly with the core bolt but before installation into said panels.

12. The blind bolt fastener of claim 1, wherein said protuberance is formed by crimping or swaging said body proximate to said radial groove.

13. The blind bolt fastener of claim 1, wherein said body further comprises a deformable region at the end opposite the enlarged head.

14. A blind bolt fastener comprising:
   a core bolt having a bolt head and a wrench engaging portion at one end and a threaded portion at the opposing end;
   a body having a bore for receiving the core bolt, the body having an enlarged body head; and
   a drive nut engaged with and substantially rotationally constrained with the body, wherein the drive nut is axially disposed in a radially overlapping orientation between the wrench engaging portion and the enlarged body head.

15. The blind bolt fastener of claim 14 wherein the enlarged body head has recesses in mating engagement with protrusions on the drive nut.

16. The blind bolt fastener of claim 14 wherein the drive nut is not in threaded engagement with the core bolt.

17. The blind bolt fastener of claim 14 wherein the body has a protuberance engaging a locking groove in the core bolt to restrict axial movement of the core bolt with respect to the body relative to the body during and after installation.

18. The blind bolt fastener of claim 17 further comprising:
   a deformable sleeve connected to the body.

19. The blind bolt fastener of claim 18 wherein the deformable sleeve and the body are integrally formed into a deformable body.

20. The blind bolt fastener of claim 18 wherein the deformable sleeve has a protrusion in wedged engagement with the body to mechanically lock the body to the deformable sleeve.

21. The blind bolt fastener of claim 14, wherein the drive nut includes opposite first and second surfaces, the first surface facing and engaging the enlarged body head and the second surface facing the wrench engaging portion.

22. The blind bolt fastener of claim 14, further comprising:
   a first locking feature associated with the core bolt;
   a second locking feature associated with the body, the second locking feature engaging with the first locking feature to restrict axial movement of the core bolt relative to the body, and
   wherein the drive nut is axially retained between the wrenching portion and the body head before installation.

23. A blind bolt fastener comprising:
   a core bolt comprising a core bolt head, a groove and an externally threaded portion;
   a body comprising a bore, an internally threaded portion, a body head and a deformable portion positioned therebetween, wherein said deformable portion is adapted to pass through an aperture in a work piece with said body head engaging a surface of said work piece opposite said deformable portion, said internally threaded portion is threadingly engaged with said externally threaded portion with said bolt head proximate to said body head and wherein said deformable portion is constructed and arranged to bulb upon tightening said core bolt relative to said body; and
   a body-to-core bolt lock that substantially restricts axial movement of the core bolt with respect to the body before, during and after installation, the body-to-core bolt lock comprising a protuberance extending inwardly from said bore to engage said groove.

24. The blind bolt fastener of claim 23, wherein said core bolt further comprises a shank portion between said groove and said externally threaded portion, wherein said shank portion has a substantially smooth wall that is bounded by said bore.

25. The blind bolt fastener of claim 23, wherein said core bolt head includes a wrench engaging portion and further comprising a drive nut engaged with and substantially rotationally constrained to said body, wherein said drive nut is axially entrapped between said body head and said wrench engaging portion thereby preventing disengagement of said drive nut from said fastener during installation.

26. The blind bolt fastener of claim 25, wherein said core bolt further comprises a weakened portion positioned between said wrench engaging portion and said core bolt head, wherein said weakened portion is constructed and arranged to fracture upon completion of the installation of the blind bolt fastener thereby separating said wrench engaging portion from the blind bolt fastener and permitting the removal of said drive nut.

27. The blind bolt fastener of claim 23, wherein said body comprises a metallic material.

28. The blind bolt fastener of the claim 23, wherein said protuberance is formed by crimping or swaging said body proximate to said groove.

29. A blind bolt fastener comprising:
a core bolt having a wrench engaging portion at one end and a threaded portion at the opposite end,
a first locking feature associated with the core bolt located between the wrench engaging portion and the threaded portion;
a break groove in the core bolt, the break groove fracturing when a predetermined amount of torque is applied to the core bolt;
a body having a bore for receiving the core bolt, the body having an enlarged head at one end; and
a second locking feature associated with the body, the second locking feature engaging with the first locking feature to restrict axial movement of the core bolt relative to the body before, during and after installation.

30. The blind bolt fastener of claim 29, wherein the first locking feature is a radial groove in the core bolt and the second locking feature is a protuberance extending inwardly within the bore and engaging with the groove.

31. A blind bolt fastener comprising:
a core bolt having a wrench engaging portion and a threaded portion positioned at opposing ends of the core bolt;
a locking groove in the core bolt located between the ends of the core bolt;
a deformable body having a bore therethrough for threadingly engaging the core bolt;
a protuberance in the body extending into the locking groove of the core bolt to restrict axial movement of the core bolt relative to the body during and after installation; and
a drive nut having protrusions engaging the deformable body.

* * * * *